(12) United States Patent
Kismarton et al.

(10) Patent No.: US 9,770,940 B2
(45) Date of Patent: Sep. 26, 2017

(54) BICYCLE WHEEL WITH UNITARY SIDE CONSTRUCTION

(71) Applicant: Cayucos Cowboys, LLC, San Luis Obispo, CA (US)

(72) Inventors: Max U. Kismarton, Renton, WA (US); Eric Hjertberg, Seattle, WA (US)

(73) Assignee: Cayucos Cowboys, LLC, San Luis Obispo, CA (US)

( * ) Notice: Subject to any disclaimer, the term of this patent is extended or adjusted under 35 U.S.C. 154(b) by 0 days.

(21) Appl. No.: 14/794,772

(22) Filed: Jul. 8, 2015

(65) Prior Publication Data
US 2015/0314640 A1 Nov. 5, 2015

Related U.S. Application Data

(63) Continuation of application No. 13/535,290, filed on Jun. 27, 2012, now Pat. No. 9,108,461.

(51) Int. Cl.
*B60B 1/04* (2006.01)
*B60B 3/08* (2006.01)
(Continued)

(52) U.S. Cl.
CPC ............ *B60B 1/041* (2013.01); *B60B 1/003* (2013.01); *B60B 3/082* (2013.01); *B60B 3/087* (2013.01);
(Continued)

(58) Field of Classification Search
CPC ......... B60B 1/041; B60B 1/003; B60B 3/082; B60B 3/087; B60B 3/10; B60B 5/02; B60B 21/06; Y10T 29/4951; Y10T 29/49526
See application file for complete search history.

(56) References Cited

U.S. PATENT DOCUMENTS

| 3,369,843 A | 2/1968 | Prew |
| 3,695,729 A | 10/1972 | Schwerdhofer |

(Continued)

FOREIGN PATENT DOCUMENTS

| CN | 1708413 A | 12/2005 |
| CN | 101472747 A | 7/2009 |

(Continued)

OTHER PUBLICATIONS

Chinese Office Action issued May 31, 2016 in corresponding Chinese Patent Application No. 201380038144.X (14 pages).
(Continued)

*Primary Examiner* — Kip T Kotter
(74) *Attorney, Agent, or Firm* — Pillsbury Winthrop Shaw Pittman LLP

(57) ABSTRACT

A wheel having a longitudinal plane normal to an axis of rotation. The wheel has a rim with side surfaces on opposite sides of the longitudinal plane. A hub is concentrically disposed relative to the rim. Two unitary side elements are disposed on opposite sides of the longitudinal plane and are coupled to the rim and to end portions of the hub. Each of the unitary side elements has an annular sidewall, a flange portion, and a plurality of spokes that do not cross the longitudinal plane and that integrally interconnect the annular sidewall and the flange portion. An end portion of each spoke of the one side element is tied to the end portion of an aligned spoke of the other side element adjacent to the sidewall to restrict the tied end portions from moving away from each other.

32 Claims, 6 Drawing Sheets

(51) Int. Cl.
*B60B 5/02* (2006.01)
*B60B 1/00* (2006.01)
*B60B 3/10* (2006.01)

(52) U.S. Cl.
CPC ............... *B60B 3/10* (2013.01); *B60B 5/02* (2013.01); *B60B 2310/204* (2013.01); *B60B 2310/242* (2013.01); *B60B 2310/306* (2013.01); *B60B 2310/318* (2013.01); *B60B 2310/52* (2013.01); *B60B 2320/12* (2013.01); *B60B 2320/122* (2013.01); *B60B 2360/36* (2013.01); *B60B 2900/10* (2013.01); *B60B 2900/112* (2013.01); *B60B 2900/113* (2013.01); *B60B 2900/115* (2013.01); *B60Y 2200/13* (2013.01); *Y10T 29/4951* (2015.01); *Y10T 29/49526* (2015.01)

(56) References Cited

U.S. PATENT DOCUMENTS

| | | | |
|---|---|---|---|
| 3,862,779 A | 1/1975 | Jayne | |
| 4,280,736 A | 7/1981 | Raudman | |
| 4,314,964 A | 2/1982 | Ferrary | |
| 4,413,860 A | 11/1983 | Prescott | |
| 4,483,729 A | 11/1984 | Fujisaki | |
| 4,511,184 A | 4/1985 | Schauf | |
| 4,527,839 A | 7/1985 | Fujitaka | |
| 4,532,097 A | 7/1985 | Daniels | |
| 4,571,005 A | 2/1986 | Nowak | |
| 4,573,745 A | 3/1986 | Fujisaki | |
| 4,793,659 A | 12/1988 | Oleff | |
| 4,844,552 A | 7/1989 | Tsygankov | |
| 4,919,490 A | 4/1990 | Hopkins | |
| 4,930,843 A | 6/1990 | Lewis | |
| 5,104,199 A | 4/1992 | Schlanger | |
| 5,184,874 A | 2/1993 | Olson et al. | |
| 5,344,219 A | 9/1994 | Adrian | |
| 5,350,221 A | 9/1994 | Pearce | |
| 5,415,463 A | 5/1995 | Olson | |
| 5,452,945 A | 9/1995 | Schlanger | |
| 5,540,485 A | 7/1996 | Enders | |
| 5,549,360 A | 8/1996 | Lipeles | |
| 5,564,793 A | 10/1996 | Whiteford | |
| 5,915,796 A | 6/1999 | Beyer | |
| 6,033,612 A | 3/2000 | Adams | |
| 6,139,040 A | 10/2000 | Dempsey | |
| 6,231,128 B1 | 5/2001 | Okajima | |
| 6,428,114 B1 | 8/2002 | Sebode | |
| 6,428,116 B1 | 8/2002 | Chou | |
| 6,761,847 B2 | 7/2004 | Meggiolan | |
| 7,361,296 B2 | 4/2008 | Adrian | |
| 7,578,563 B2 | 8/2009 | Muraoka | |
| 7,603,776 B2 | 10/2009 | Jager | |
| 7,658,450 B2 | 2/2010 | Mercat | |
| 8,162,407 B2 | 4/2012 | Mercat et al. | |
| 8,528,991 B2 | 9/2013 | Schlanger | |
| 9,108,461 B2 * | 8/2015 | Kismarton | B60B 3/082 |
| 2006/0103231 A1 | 5/2006 | Fioravantil | |
| 2007/0194619 A1 | 8/2007 | Colegrove | |
| 2007/0205654 A1 | 9/2007 | Denk | |
| 2008/0191543 A1 | 8/2008 | Saillet | |
| 2008/0265656 A1 | 10/2008 | Heyse | |
| 2008/0265659 A1 | 10/2008 | Heyse | |
| 2008/0284237 A1 | 11/2008 | Tsai | |
| 2008/0296962 A1 | 12/2008 | Tsai | |
| 2009/0152938 A1 | 6/2009 | Tsai | |
| 2009/0160243 A1 | 6/2009 | Mercat et al. | |
| 2010/0253132 A1 | 10/2010 | Schlanger | |
| 2010/0301663 A1 | 12/2010 | Kismarton | |

FOREIGN PATENT DOCUMENTS

| | | |
|---|---|---|
| CN | 201951161 U | 8/2011 |
| FR | 2933030 A1 | 1/2010 |
| JP | 59-32501 | 2/1984 |
| JP | 7-505349 | 6/1995 |
| JP | 9-99702 | 4/1997 |
| WO | WO 93/19944 | 10/1993 |
| WO | 9625296 A1 | 8/1996 |

OTHER PUBLICATIONS

International Search Report mailed Aug. 2, 2010, issued in corresponding International Application No. PCT/US2010/036155, filed May 26, 2010; 2 pages.
PCT International Preliminary Report on Patentability dated Dec. 31, 2014, issued in corresponding PCT Application No. PCT/US2013/047985; 4 pages.
First Examination Report issued Dec. 16, 2015 in corresponding New Zealand Patent Applicaton No. 703882 (5 pages).
Japanese Office Action dated Feb. 14, 2017 for Appln. No. 2015-520475.
Australian Office Action dated Jul. 29, 2016 for Appln. No. 2013280303.
Chinese Office Action dated Nov. 29, 2016 for Appln. No. 201380038144.
Taiwan (ROC) Office Action dated Apr. 10, 2017 for Appln. No. 102123095.
Translation of Search Report—ROC (TAIWAN) for Appln. No. 102123095.

* cited by examiner

BICYCLE WHEEL WITH UNITARY SIDE CONSTRUCTION

CROSS-REFERENCE TO RELATED APPLICATIONS

This application is a continuation of U.S. patent application Ser. No. 13/535,290, filed Jun. 27, 2012, now issued under U.S. Pat. No. 9,108,461, entitled "BICYCLE WHEEL WITH UNITARY SIDE CONSTRUCTION", the contents of which are incorporated by reference in its entirety herein.

TECHNICAL FIELD

Embodiments of the present invention are directed to bicycle wheels, including fiber-based bicycle wheels.

BACKGROUND

Conventional prior art bicycle wheels are typically made of metal, such as Aluminum and/or Aluminum alloys, that can withstand the expected forces encountered during use on a bicycle. These prior art bicycle wheels include a metal rim, metal center hub, and a plurality of metal spokes that screw into or otherwise adjustably attach to the rim and/or the hub. The Aluminum wheels can be heavy and often provide a fairly rough ride. Other prior art bicycle wheels include components made of light weight material, such as carbon fiber or other composite fiber materials. An example of the composition fiber wheel is disclosed in Applicant's co-pending U.S. patent application Ser. No. 12/709,178 (Publication No. 2010/0301663), filed Feb. 19, 2010, titled Composition Fiber Bicycle Wheels, which is incorporated herein in its entirety by reference thereto. Carbon-fiber wheels are typically constructed by individually and independently forming various, fully cured carbon-fiber components of the wheel, such as the rim, spokes, flange, etc. These multiple individual components are then assembled together in a jig or other structure and bonded together to form the wheel. The alignment of the components relative to each other must be exact, and the joints between all of the components must be analyzed and inspected. The resulting carbon-fiber wheel is an excellent, light weight, smooth-riding wheel, although the manufacturing process can be time and labor intensive.

SUMMARY

This disclosure is directed to vehicle wheels and related manufacturing methods that overcome drawbacks in the prior art, and provide other benefits. This disclosure describes wheels for use on a bicycle, including fiber-based wheels. At least one aspect of the disclosure provides a bicycle wheel with a rim with first and second side surfaces on opposite sides of a longitudinal plane. A hub having first and second end portions on opposite sides of the longitudinal plane is axially aligned and concentrically disposed relative to the rim. Two unitary side elements are disposed on opposite sides of the longitudinal plane and are coupled to the rim and to the hub. Each of the unitary side elements has a plurality of spokes integrally interconnecting an annular sidewall and a flange portion.

In one embodiment, the annular sidewall of one side element is fixed to one side of the rim, and the flange portion is fixed to one end portion of the hub. The annular sidewall of the other side elements is fixed to the other side of the rim, and its flange portion is fixed to the other end portion of the hub. The spokes of the side elements are in tension between the sidewall and the flange of the respective side element.

In at least one embodiment, the spokes of a first side element are positioned in alignment with the spokes of a second side element, and each spoke of the first and second side elements has an end portion adjacent to the sidewalls. The end portion of each spoke of the first side element is tied to the end portion of an aligned spoke of the second side element to restrict the end portions tied together from moving away from each other in a direction normal to the longitudinal plane.

In at least one embodiment, the side elements are fiber-based components having continuous first fibers span between the annular sidewall and the spokes, and continuous second fibers span between the spokes and the flange portion.

Another aspect of the disclosure provides a pair of unitary structural side elements for use on a wheel having a rim and hub. Each unitary structural side element is a one-piece member having an annular sidewall, a flange portion, a plurality of spokes integrally interconnecting the annular sidewall and the flange portion. Each annular sidewall is configured to fixedly connect to the rim and each flange portion is configured to fixedly connect to the hub. The plurality of spokes of the first and second side elements are configured to be in tension between the sidewall and the flange, and each side element configured to be on opposite sides of a longitudinal plane of the rim without crossing to the other side of the longitudinal plane when the spokes are in tension. In at least one embodiment, the side elements are unitary fiber-based units with continuous first fibers spanning between the annular sidewall and the spokes, and with continuous second fibers spanning between the spokes and the flange portion.

Another aspect of the disclosure provides a bicycle wheel rotatable about an axis of rotation and having a central longitudinal plane normal to the axis of rotation. The wheel has a rim with first and second side surfaces on opposite sides of the longitudinal plane. A hub having first and second end portions is coaxially aligned with the axis of rotation and is disposed radially inward of the rim. A unitary first side element is coupled to the rim and to the hub. The first side element has a first sidewall fixed to the first side of the rim, a first flange portion coupled to the first end portion of the hub, and a plurality of first spokes integrally connected at first ends to the first sidewall and integrally connected at second ends to the first flange portion. The first spokes are disposed on the first side of the longitudinal plane and are connect to the first sidewall on the first side of the longitudinal plane.

The wheel has a unitary second side element coupled to the rim and to the hub opposite the first side element and on the second side of the longitudinal plane. The second side element has a second sidewall fixed to the second side of the rim, a second flange portion coupled to the second end portion of the hub, and a plurality of second spokes integrally connected at first ends to the second sidewall and integrally connected at second ends to the second flange portion. The second spokes are disposed on the second side of the longitudinal plane and are connected to the second sidewall on the second side of the longitudinal plane.

The first spokes are held in tension between the first sidewall and the first flange portion, and the second spokes are held in tension between the second sidewall and the second flange portion. Each of the first spokes is aligned with a respective one of the second spokes to form a pair of aligned spokes on opposite sides of the longitudinal plane.

The first end portions of each of the first and second spokes of the pair of aligned spokes are tied together with a tie member that restricts the first end portions of the pair of aligned spokes from moving away from each other in a direction normal to the longitudinal plane.

Another aspect of the disclosure provides a method of making a bicycle wheel having a rim, a hub, and a pair of opposing unitary first and second side elements. The wheel has an axis of rotation and a longitudinal plane normal to the axis of rotation. The method includes attaching the first and second unitary side elements to the rim, wherein each of the side elements has an annular sidewall, a flange portion, a plurality of spokes integrally interconnecting the annular sidewall and the flange portion. The annular sidewall of the unitary first side element is attached to a first side surface of the rim on a first side of the longitudinal plane, and the annular sidewall of the unitary second side element is attached to a second side surface of the rim on a second side of the longitudinal plane. The flange portion of the unitary first side element is attached to a first end portion of the hub on the first side of the longitudinal plane, and the flange portion of the unitary second side element is attached to a second end portion of the hub on the second side of the longitudinal plane, wherein the spokes of the first and second side elements are held in tension between the sidewall and flange of the respective unitary first and second sidewalls. The first and second side elements are positioned with spokes of the first side element disposed on the first side of the longitudinal plane and do not cross to the second side of the longitudinal plane, and the spokes of the second side element are disposed on the second side of the longitudinal plane and do not cross to the first side of the longitudinal plane. Each of the spokes of the first side element is aligned with a respective one of the spokes of the second side element to form a pair of aligned spokes on opposite sides of the longitudinal plane. The method includes tying with a tie member the end portions of each of the spokes of the pair of aligned spokes adjacent to the sidewalls and restricting the end portions of the pair of aligned spokes from moving away from each other in a direction normal to the longitudinal plane.

Another aspect of the disclosure provides a method of making a wheel for a bicycle. The method of one embodiment comprises forming unitary fiber-based first and second side elements each having an annular sidewall, a central flange portion radially inward of the sidewall, and a plurality of spokes extending between the sidewall and the central flange, wherein each side element is formed by laying up a plurality of sheets of fiber-based material shaped to form the sidewall, the central flange and the spokes with at least first continuous fibers extending between the flange and the spokes and at least second continuous fibers extending between the spokes and the central flange, and curing the entire side element with heat and pressure in one curing process to form a cured side element with the spokes integrally connected to the sidewall and the flange. The method also comprises positioning the first and second side elements adjacent to a rim and with the spokes in alignment with each other, and affixing the sidewalls of the first and second side elements to opposing side surfaces of a rim. The method also comprises positioning the central flanges of the first and second side elements on a hub and positioning the first and second side elements so the spokes are in tension, and fixing the flanges of the first and second side elements to the hub.

Another aspect of the disclosure provides a method of making unitary, fiber-based side elements for a wheel of a bicycle. The method comprises laying up a plurality of sheets of fiber-based material shaped and sized to form an annular sidewall, a central flange portion radially inward of the sidewall, and a plurality of spokes extending between the sidewall and the central flange, wherein at least first continuous fibers extend across a portion of the flange and a portion of each of the spokes and at least second continuous fibers extend across each of the spokes and the central flange. The method also comprises curing the entire side element with heat and pressure in one curing process to form a unitary, cured side element with the spokes integrally connected to the sidewall and the central flange.

DETAILED DESCRIPTION

The present disclosure describes fiber-based bicycle wheels, including carbon fiber or other composite fiber bicycle wheels, and related manufacturing methods in accordance with certain embodiments of the present invention. Several specific details of the embodiments are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
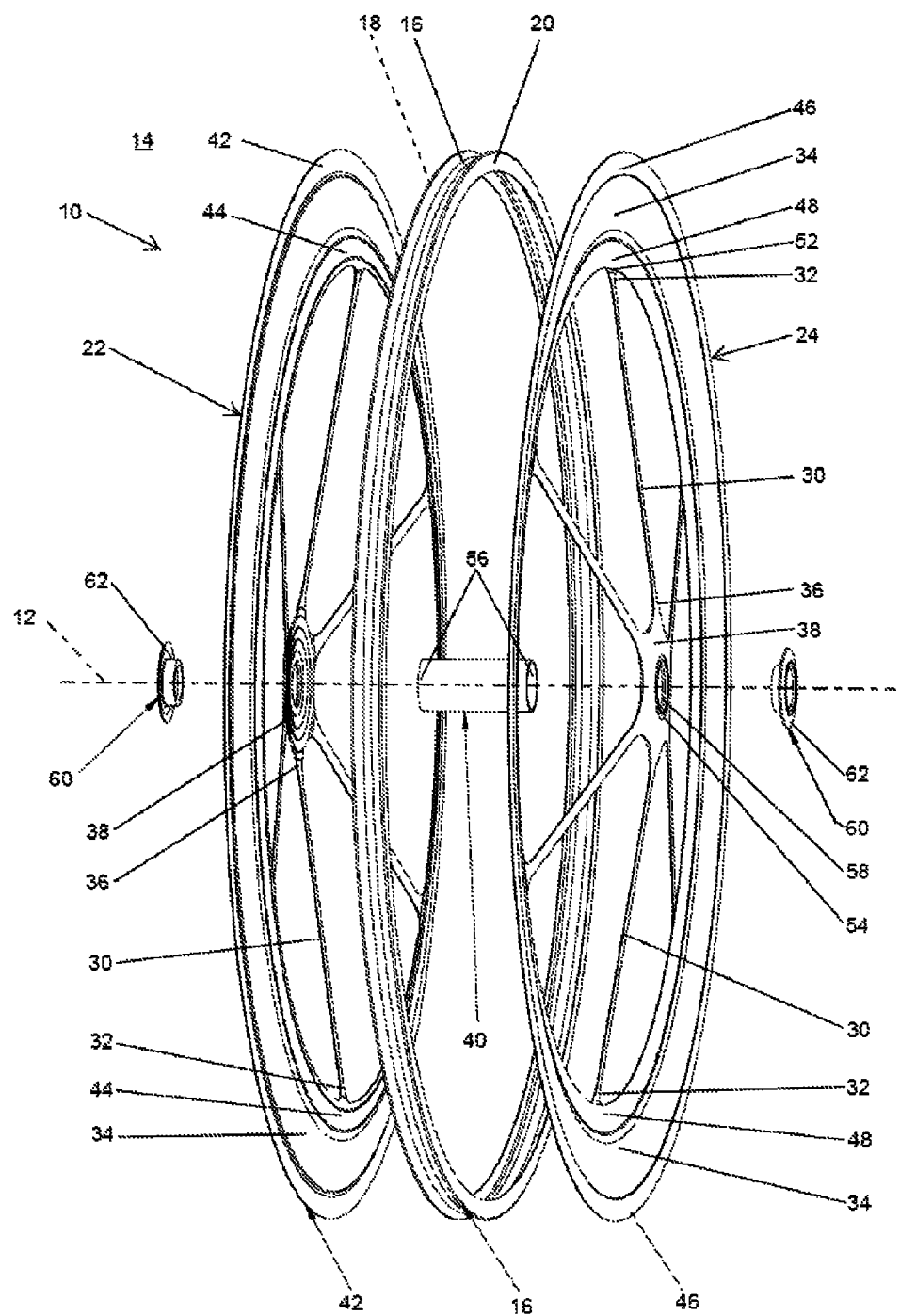
FIG. 1 is a partially exploded isometric view of a bicycle wheel in accordance with an embodiment of the present disclosure.
Figure 2:
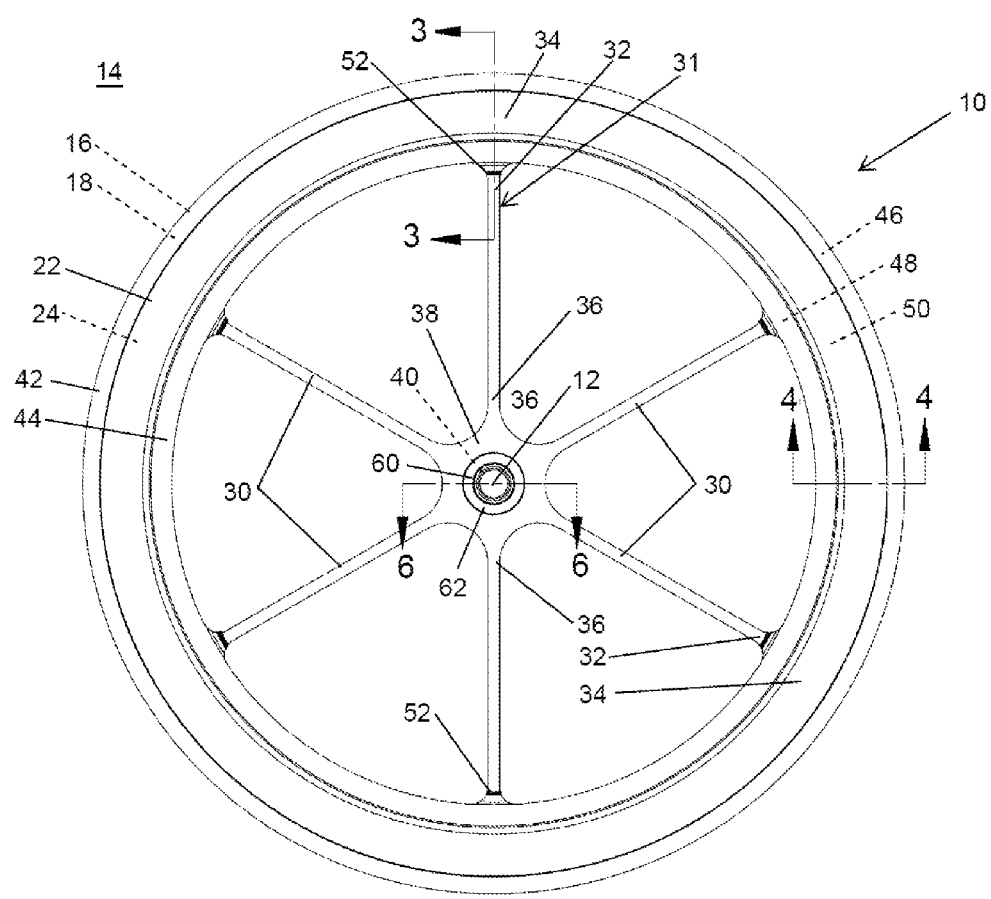
FIG. 2 is a side elevation view of the wheel of FIG. 1.

FIG. 1 is a partially exploded isometric view of a bicycle wheel 10 in accordance with an embodiment of the present disclosure, and FIG. 2 is a side elevation view of the wheel 10. For purposes of establishing a frame of reference, the wheel 10 is rotatable about a central axis of rotation 12 and is generally symmetrical about a longitudinal plane 14 normal to the central axis 12. When viewing the illustrated embodiment of the wheel 10 in FIG. 2, the longitudinal plane 14 is parallel to the page, and the central axis 12 extends normally into or out of the page.

The wheel 10 of the illustrated embodiment has an annular rim 16 co-axially aligned with the central axis 12 and generally symmetrical about the longitudinal plane 14. The rim 16 has first and second side surfaces 18 and 20 disposed on opposite sides of the longitudinal plane 14. As shown in FIG. 1, the first side surface 18 is a left side surface, and the second side surface 20 is a right side surface. It is to be understood that the terms "left" and "right" are used herein for purposes of spatial reference for explaining the embodiments relative to the drawings shown in the Figures. The rim 16 can be a clincher style rim, or in other embodiments, the rim can be a tubular or sew-up style rim. The rim 16 can be made of fiber-based material, such as carbon-fiber material or other suitable fiber-based material. In other embodiments, the rim can be made of a metal material, such as Aluminum, Aluminum alloy, or other suitable metal. In yet other embodiments, the rim 16 can be made of other materials that have strength and durability characteristics suitable for use in a wheel, such as a high performance vehicle wheel assembly.

The wheel 10 has unitary, left and right side elements 22 and 24, respectively, disposed on opposite sides of the longitudinal plane 14. The unitary side elements can be made of fiber-based material (including carbon fiber or other composite fiber material), durable plastic, metal, or other sufficiently strong and durable material that can withstand the forces applied to the wheel during use. The left side element 22 is fixedly coupled to the rim's left side surface 18, and the right side element 24 is fixedly coupled to the rim's right side surface 20. The side elements 22 and 24 can be bonded, glued, welded (including ultrasonic welding, friction welding, induction welding, etc.), melted, or otherwise securely joined to the side surfaces 18 and 20 of the rim 16. In the illustrated embodiment, the left and right side elements 22 and 24 have substantially the same construction. The left and right side elements 22 and 24 are each one-piece, unitary structures having a plurality of spokes 30 each integrally connected at an outer end portion 32 to an annular sidewall 34. The spokes 30 are also each integrally connected at an inner end portion 36 to a central flange portion 38 coaxially disposed about the central axis 12. The flange portion 38 is bonded, glued, welded (including ultrasonic welding, friction welding, induction welding, etc.), melted, or otherwise securely joined to a central hub 40 configured to receive an axle structure about which wheel 10 spins.

The hub 40 of the illustrated embodiment is a tubular member with end portions on opposite sides of the longitudinal plane 14, and the hub is co-axially aligned and concentrically disposed relative to the rim 16. Accordingly, each of the unitary side elements 22 and 24 extend between and structurally interconnect the rim 16 and the hub 40. While the illustrated embodiment shows a flange for a front wheel of a bicycle, the same arrangement is used for a back wheel, except that the shape of the central flange is suitable to accommodate the hub 40, axle and gears for the rear wheel.

Figure 3:
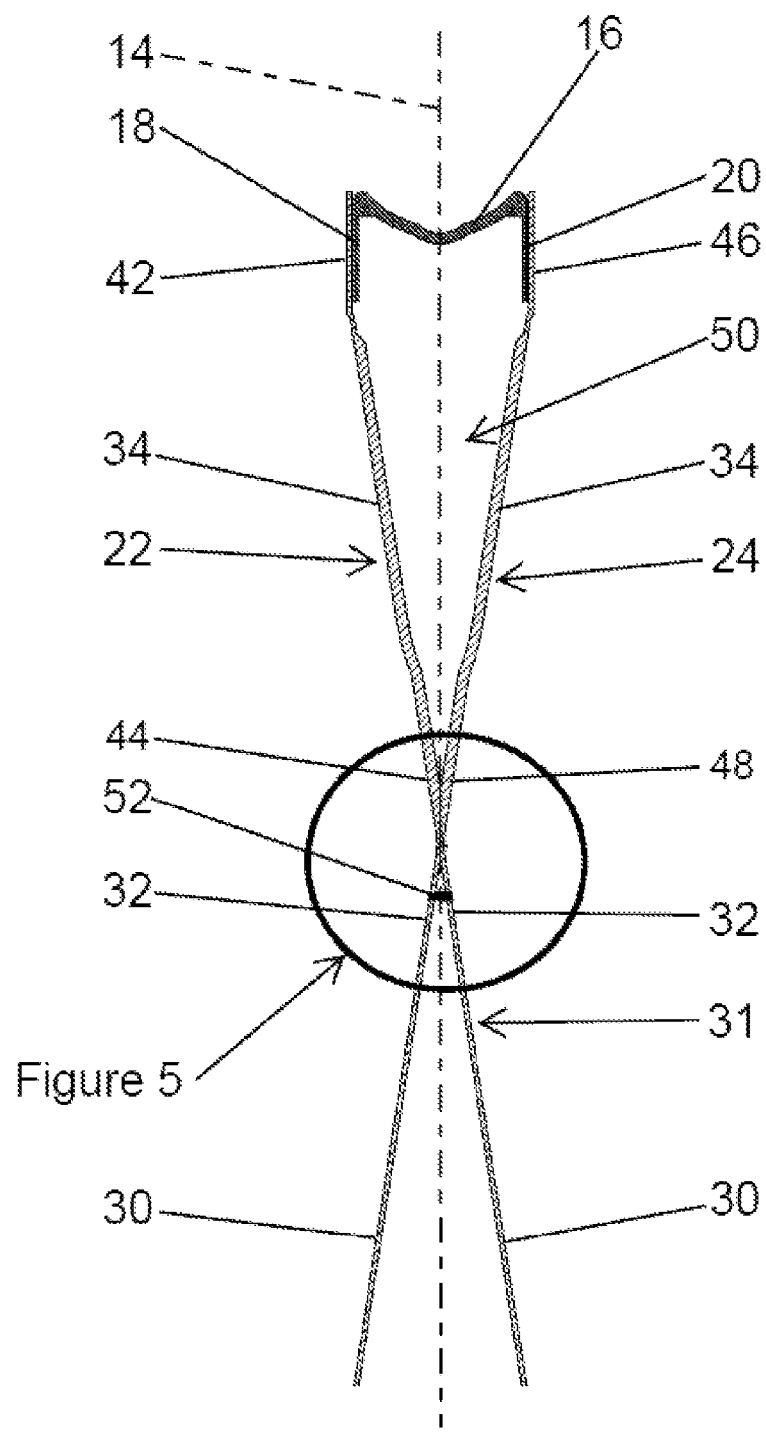
FIG. 3 is a cross sectional view taken substantially along lines 3-3 of FIG. 2.
Figure 4:
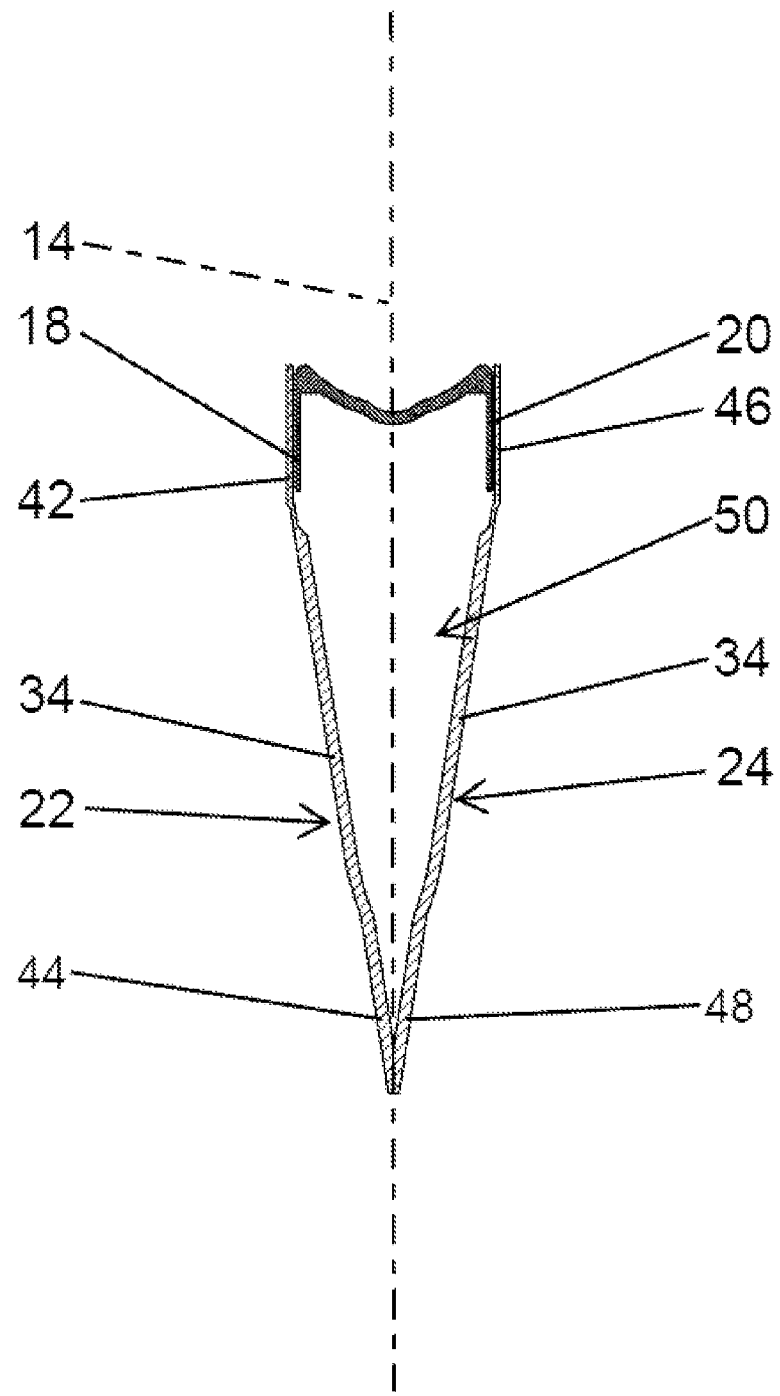
FIG. 4 is a cross sectional view taken substantially along lines 4-4 of FIG. 2.

As seen in FIGS. 3 and 4, the annular sidewall 34 of the left side element 22 has a radially outer engagement portion 42 securely fixed to the rim's left side surface 18. The left sidewall 34 extends radially inward and toward the longitudinal plane 14 and terminates at a radially inner edge portion 44. The annular sidewall 34 of the right side element 24 has a similar construction with a radially outer engagement portion 46 securely fixed to the rim's right side surface 20. The right sidewall 34 extends radially inward and toward the longitudinal plane 14 and terminates at a radially inner edge portion 48 immediately adjacent to the inner edge portion 44 of the left sidewall 34. Accordingly, the left and right sidewalls 34 extend away from the rim 16 and converge toward each other to define a wedge-shaped space 50 between the sidewalls 34.

In the illustrated embodiment, the left and right inner edge portions 44 and 48 of the sidewalls 34 define engagement portions that are bonded, glued, welded (including ultrasonic welding, friction welding, induction welding, etc.), melted, or otherwise securely joined to each other substantially at the longitudinal plane 14, such that the wedge-shaped space 50 between the sidewalls 34 inward of the rim 16 is fully sealed. The illustrated embodiment uses adhesive to bond the sidewalls together and to the rim, other embodiments can use other suitable techniques or mechanisms to couple the sidewalls 34 to the rim 16.

As shown in FIGS. 1 and 2, each of the left and right side elements 22 and 24 have six spokes 30 uniformly distributed around the wheel 10. In other embodiments, the side elements 22 and 24 can have more or less than six spokes 30. The left and right side elements 22 and 24 can have different numbers of spokes 30, such as two or four spokes on one side element and six or eight on the other side element. In the illustrated, each spoke 30 on the left side element 22 is aligned with a corresponding spoke 30 on the right side element 24 to define a pair 31 of aligned composite fiber spokes 30 on opposite sides of the longitudinal plane 14.

Figure 5:
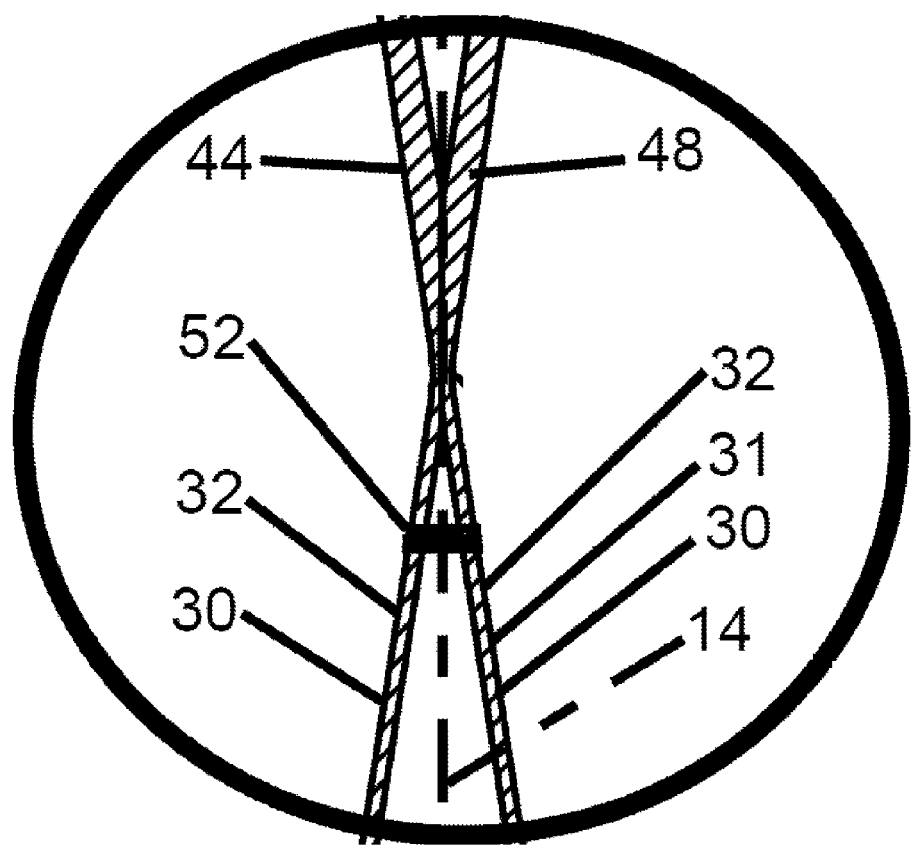
FIG. 5 is an enlarged sectional view taken substantially at area 5 of FIG. 4.

As seen in FIGS. 3 and 5, the outer end portion 32 of each spoke 30 of the left side element 22 is integrally connected with the inner edge portion 44 of the left sidewall 34. Similarly, the outer end portion 32 of each spoke 30 of the right side element 24 is integrally connected with the inner edge portion 48 of the right sidewall 34. In at least one embodiment, the side elements 22 and 24 are unitary fiber-based side elements, such as carbon fiber units or other composite fiber units. The integral connection between the sidewall 34 and the spokes 30 includes one or more layers of continuous composite fiber material, such as carbon-fiber fabric, that forms portions of the sidewall 34 and the outer end portion 32 of the corresponding spoke 30. Accordingly, continuous fibers span across portions of the sidewalls 34 and the spokes 30 to provide a very strong interconnection between these integrally connected components.

In the illustrated embodiment, the inner edge portions 44 and 48 of the left and right sidewalls 34 are connected to each other, and each aligned pair 31 of spokes 30 connected to each of the left and right sidewalls 34 also converge such that the outer end portions 32 of the aligned spokes 30 are immediately adjacent to each other. In at least one embodiment, the outer end portions 32 of each pair 31 of spokes 30 are connected to each other substantially at the longitudinal plane 14. It is noted, however, that spokes 30 of the left side element 22 integrally connect to the left sidewall 34 and do not cross over to the right side of the longitudinal plane 14. Similarly, the spokes 30 of the right side element 24 integrally connect to the right sidewall 34 and do not cross over to the left side of the longitudinal plane 14.

The wheel 10 of at least one embodiment includes a tying member 52 adjacent to the left and right sidewalls 34 and positioned to tie the outer end portions 32 of each pair 31 of aligned spokes 30 together to prevent or otherwise resist the spoke's outer end portions 32 (and the associated inner edge portions 44/48 of the sidewalls 34) from pulling apart from each other in a direction normal to the longitudinal plane 14 during use of the wheel 10. The tying member 52 can be a lashing member that wraps around outer end portions 32 of the aligned spokes 30 immediately adjacent to the sidewalls 34. The tying member 52 can be a composite fiber material, such as a carbon-fiber material wrapped around the spokes 30 and cured in place. In other embodiments, the tying member 52 can be a clip or other mechanical device that fixedly attaches to the spokes 30 or the sidewalls 34 and prevents the spokes and sidewalls from separating.

Figure 6:
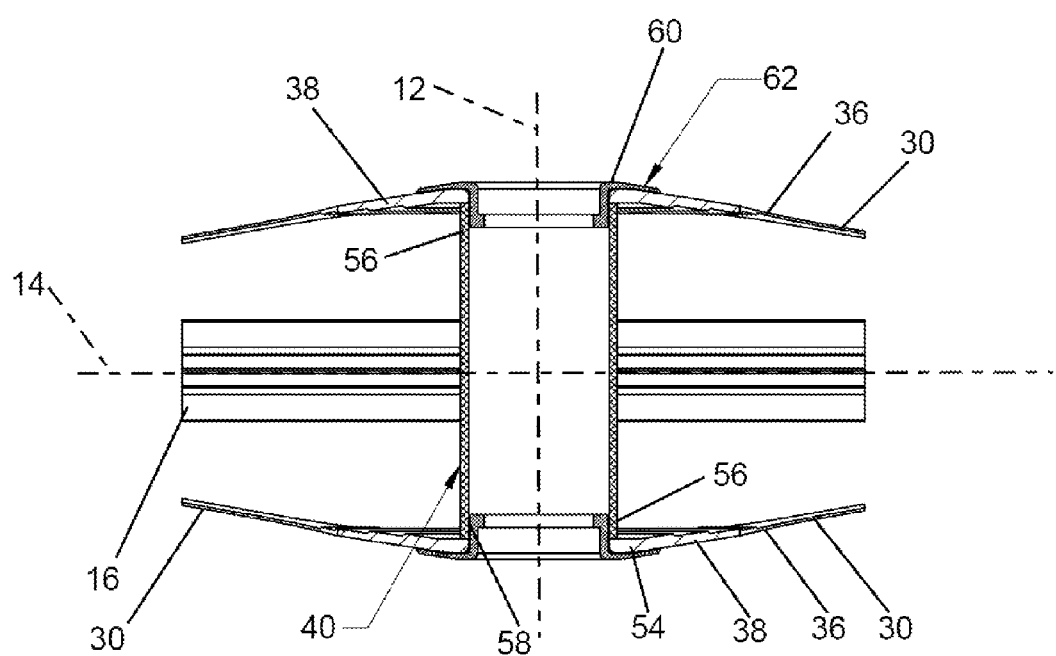
FIG. 6 is a cross sectional view taken substantially along lines 6-6 of FIG. 2.

FIG. 6 is a cross-sectional view showing the integral connection between the spokes 30 and the central flange 38 of each of the left and right side elements 22 and 24. In the embodiment with the unitary, fiber-based side elements 22 and 24, the spokes 30 are integrally connected to the respective central flange 38 with one or more layers of continuous composite fiber material, such as carbon-fiber fabric, that forms portions of the inner end portion of the spoke 30 and the central flange 38. Accordingly, continuous fibers span across portions of each spoke 30 and the adjacent portion of the central flange 38 to provide a very strong interconnection between these integrally connected components. In at least one embodiment, one or more layers of composite fiber material form portions of the spoke 30, the central flange 38 and the sidewall 34 of the respective left or right side element 22 or 24. Accordingly, continuous fibers extend the full length of the spoke and along adjacent portions of the flange and sidewall. This arrangement of continuous fibers extending fully across the flange, spoke and sidewall configuration provides a very strong interconnection between these integrally connected components, while minimizing the weight of the wheel 10.

As seen in FIG. 6, the radially inward portion 54 of each central flange 38 is connected to outer end portions 56 of the hub 40. In the illustrated embodiment, the central flange 38 has an aperture 58 coaxially aligned with the central axis 12, and the aperture 58 has a diameter that substantially corresponds to the inner diameter of the hub 40. A cap 60 extends through the aperture 58 and partially into or against the hub 40, such that the central flange 38 around the aperture 58 is rigidly captured between a head 62 of the cap 60 and the hub 40. In the illustrated embodiment, the caps 60 also capture the hub 40 in compression, which maintains the static tension in the wheel 10. The cap 60 is adhered to the central flange 38 and/or the outer end portions 56 of the hub 40, so that the central flanges 38 of the left and right side elements 22 and 24 are supported apart from each other on opposite sides of the longitudinal plane 14 and at the ends of the hub 40. This arrangement of the hub 40, the spaced apart central flanges 38 and the integrally connected spokes 30 each tied together with the respective mating spoke 30 at the outer end portion 32 results in the spokes 30 around the wheel 10 being held in uniform tension. The caps 60 of the illustrated embodiment include internal bearings coaxially aligned with the axis of rotation, and the bearings support the wheel's axle for smooth rotation about the axis of rotation. The caps 60 in other embodiments can also include features, for example, to support an external or internal gear system, external (disk) or internal (drum) brake system, a power meter, an electric motor, a generator, batteries, or other suitable components usable when riding the bicycle.

The caps 60 are annular members configured to allow an axle assembly to be disposed in the hub 40 in position to connect to a bicycle. The caps 60 can be a carbon fiber or other composite fiber material affixed to the central flange 38 of each side element 22 and 24. In other embodiments, the caps 60 can be a metal, such as an Aluminum alloy, or other suitable metal material that can be fixedly bonded or otherwise securely attached to the central flanges 38 and/or the hub 40.

The left and right side elements 22 and 24 of the wheel 10 can be constructed as generally flat, one-piece unitary members that can be attached as a unit to the rim 16 and the hub 40. For example, in at least one embodiment wherein the side elements are unitary, carbon-fiber side elements, each of the left and right side elements 22 and 24 are formed by laying up a plurality of layers of carbon-fiber fabric material shaped and oriented to define the sidewall 34, the spokes 30 and central flange 38. This entire arrangement of carbon-fiber layers is positioned as a unit in a generally flat position in a fixture and cured using heat and pressure. In one embodiment, multiple pieces of the carbon-fiber fabric in selected shapes are laid up so that at least one continuous piece of fabric is positioned to form the integral interface between each spoke 30 and the adjacent portion of the sidewall 34. A continuous piece of the fiber-based fabric in a selected shape is positioned to form the integral interface between each spoke 30 and the central flange 38. In at least one embodiment, a continuous piece of the fabric can be shaped and sized to form a layer that extends along the entire spoke and portions of each of the associated sidewall 34 and central flange 38. In this arrangement, generally radially oriented, continuous fibers can span across the flange, the entire spoke 30 and the sidewall 34.

After the side elements 22 and 24 have been cooled and removed from the fixture, they are relatively flat and the spokes 30 are not yet in tension. The side elements 22 and 24 are then bonded or otherwise affixed to the respective left and right side surfaces 18 and 20 of the rim 16, and the outer end portions 32 of the spokes 30 are tied together with the tying member 52. The hub 40 is positioned between the central flanges 38 at the hub's outer ends 56 so the central flanges 38 are held apart from each other, and the caps 60 are fixed in place to capture the central flanges against the hub 40. The spokes 30 are uniformly tensioned around the wheel 10 and maintained in tension when the central flanges 38 are moved apart from each other and fixed to the outer ends of the hub 40 and/or the cap 60. After the side elements 22 and 24 and the other components are bonded, adhered or otherwise fixed together, the resulting wheel 10 is an incredibly strong, light weight, durable, balanced, and trued wheel that provides a very smooth ride for the bike and rider.

This construction of the side elements 22 and 24 allow the components to be fully laid up and cured in a single step, and results in precise alignment of the integrally formed portions. This construction also eliminates multiple individual lap joints between the spokes and the sidewalls and/or central flange. The construction also provides structural integrity across the integrally connected components, which provides a stronger wheel that can be manufactured in a less costly or time-intensive manner.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

What is claimed is:

1. A bicycle wheel having a longitudinal plane normal to an axis of rotation, comprising:
   a rim with first and second side surfaces on opposite sides of the longitudinal plane;
   a hub having first and second end portions on opposite sides of the longitudinal plane and being axially aligned and concentrically disposed relative to the rim; and
   a pair of unitary side elements disposed on opposite sides of the longitudinal plane and being coupled to the rim and to the hub, and each of the side elements having an annular sidewall, a flange portion, a plurality of spokes integrally interconnecting the annular sidewall and the flange portion, the side elements include first and second side elements, the annular sidewall of the first side element is fixed to the first side of the rim, and the flange portion of the first side element is fixed to the first end portion of the hub, and the annular sidewall of the second side element is fixed to the second side of the rim, and the flange portion of the second side element is fixed to the second end portion of the hub, the plurality of spokes of the first and second side elements are in tension between the sidewall and the flange of the respective first and second side elements;

wherein the spokes of the first side element are positioned in alignment with the plurality of spokes of the second side element, each spoke of the first and second side elements has an end portion adjacent to the sidewalls, and the end portion of each spoke of the first side element is tied to the end portion of an aligned spoke of the second side element near the annular sidewalls to restrict the end portions tied together from moving away from each other in a direction normal to the longitudinal plane, and wherein each of the flange portions of the first side element and the second side element are fixed to their respective end portions of the hub using a cap, wherein the cap captures a portion of each flange portion between a head of the cap and the hub.

2. The wheel of claim 1 wherein the pair of unitary, side elements are fiber-based side elements and the plurality of spokes integrally interconnecting the annular sidewall and the flange portion with continuous first fibers spanning between the annular sidewall and the spokes, and with continuous second fibers spanning between the spokes and the flange portion.

3. The wheel of claim 1 wherein the sidewalls of the first and second side elements each have a first engagement portion fixed to the rim and a second engagement portion disposed radially inward from the first engagement portion, wherein the second engagement portions of the first and second side elements are fixed to each other.

4. The wheel of claim 1 wherein the first and second sidewalls extend radially inward from the rim and converge toward each other, and radially inward edge portions of the first and second sidewalls are connected to each other substantially at the longitudinal plane.

5. The wheel of claim 1 wherein the unitary side elements are each unitary carbon-fiber structures.

6. The wheel of claim 5 wherein at least a portion of one of the spokes of the first side element and a portion of the flange portion of the first side element are constructed of at least one continuous portion of a layer of fiber-based material.

7. The wheel of claim 6 wherein the layer of cured, fiber-based material is a carbon-fiber material.

8. The wheel of claim 6 wherein at least a portion of one of the spokes of the second side element and a portion of the flange portion of the second side element are constructed of at least one continuous portion of a second layer of fiber-based material.

9. The wheel of claim 5 wherein at least a portion of a spoke, a portion of the sidewall and a portion of the flange portion of the first side element are constructed of a portion of at least one continuous layer of cured, fiber-based material.

10. The wheel of claim 9 wherein at least a portion of a spoke, a portion of the sidewall and a portion of the flange portion of the second side element are constructed of a portion of at least one continuous second layer of cured, fiber-based material.

11. A bicycle wheel having a longitudinal plane normal to an axis of rotation, comprising:

a rim with first and second side surfaces on opposite sides of the longitudinal plane;

a hub having first and second end portions on opposite sides of the longitudinal plane and being axially aligned and concentrically disposed relative to the rim;

a pair of unitary side elements disposed on opposite sides of the longitudinal plane and being coupled to the rim and to the hub, and each of the side elements having an annular sidewall, a flange portion, a plurality of spokes integrally interconnecting the annular sidewall and the flange portion with continuous first fibers spanning between the annular sidewall and the spokes, and with continuous second fibers spanning between the spokes and the flange portion; and wherein the side elements include first and second side elements, the annular sidewall of the first side element is fixed to the first side of the rim, and the flange portion of the first side element is fixed to the first end portion of the hub, and the annular sidewall of the second side element is fixed to the second side of the rim, and the flange portion of the second side element is fixed to the second end portion of the hub, the plurality of spokes of the first and second side elements are in tension between the sidewall and the flange of the respective first and second side elements and wherein each of the flange portions of the first side element and the second side element are fixed to their respective end portions of the hub using a cap, wherein the cap captures a portion of each flange portion between a head of the cap and the hub.

12. A pair of unitary side elements for use on a bicycle wheel having a rim, a hub and a longitudinal plane, each side element being a unitary member having an annular sidewall, a flange portion, a plurality of spokes integrally interconnecting the annular sidewall and the flange portion and wherein each annular sidewall is configured to fixedly connect to the rim and each flange portion is configured to fixedly connect to the hub using a cap, each one of the annular sidewalls having a radially inner edge portion configured to be securely attached to the radially inner edge portion of the other one of the sidewalls, and the plurality of spokes of the first and second side elements are configured to be in tension between the sidewall and the flange, each side element being configured to be on opposite sides of the longitudinal plane without crossing to the other side of the longitudinal plane when the spokes are in tension, wherein end portions of spokes from each of the side elements are tied to each other adjacent to the sidewalls and restricted from moving away from each other in a direction normal to the longitudinal plane and wherein the cap captures a portion of each flange portion between a head of the cap and the hub.

13. The pair of unitary side elements of claim 12 wherein each of the side elements is a fiber based side element with continuous first fibers spanning between the annular sidewall and the spokes, and with continuous second fibers spanning between the spokes and the flanges portion.

14. A pair of fiber-based side elements for use on a bicycle wheel having a rim, a hub and a longitudinal plane, each side element being a unitary member having an annular sidewall, a flange portion, a plurality of spokes integrally interconnecting the annular sidewall and the flange portion with continuous first fibers spanning between the annular sidewall and the spokes, and with continuous second fibers spanning between the spokes and the flange portion, and wherein each annular sidewall is configured to fixedly connect to the rim and each flange portion is configured to fixedly connect to the hub using a cap that captures a portion of each flange portion between a head of the cap and the hub, and the plurality of spokes of the first and second side elements are configured to be in tension between the sidewall and the flange portion, each side element being configured to be on opposite sides of the longitudinal plane without crossing to the other side of the longitudinal plane when the spokes are in tension.

15. The side elements of claim 14 wherein each one of the annular sidewalls has a radially inner edge portion configured to be securely attached to the radially inner edge portion of the other one of the sidewalls.

16. The side elements of claim 14 wherein at least a portion of one of the spokes of a first side element and a portion of the flange portion of the first side element are constructed of at least one continuous portion of a layer of fiber-based material.

17. The side elements of claim 16 wherein at least a portion of the spoke of the first side element and a portion of the sidewall of the first side element are constructed of at least one continuous portion of the layer of fiber-based material.

18. A wheel rotatable about a central axis and having a central longitudinal plane normal to the central axis, the wheel comprising:
a rim with first and second side surfaces, the rim being substantially circular and disposed about the central axis, and wherein the first side surface is positioned on a first side of the longitudinal plane, and the second side surface is positioned on a second side of the longitudinal plane opposite the first side;
a hub tube having first and second end portions aligned with the central axis and radially disposed inward of the rim;
a unitary, first side element coupled to the rim and to the hub tube, the first side element being positioned on the first side of the longitudinal plane, the first side element having a first sidewall fixed to the first side of the rim, a first central flange portion coupled to the first end portion of the hub tube, a plurality of first spokes integrally connected at first ends to the first sidewall and integrally connected at second ends to the first central flange portion, the first spokes being disposed on the first side of the longitudinal plane and connecting to the first sidewall on the first side of the longitudinal plane;
a unitary, second side element coupled to the rim and to the hub tube, the second side element being positioned on the second side of the longitudinal plane, the second side element having a second sidewall fixed to the second side of the rim, a second central flange portion coupled to the second end portion of the hub tube, a plurality of second spokes integrally connected at first ends to the second sidewall and integrally connected at second ends to the second central flange portion, the second spokes being disposed on the second side of the longitudinal plane and connecting to the second sidewall on the second side of the longitudinal plane; and
wherein the first spokes are held in tension between the first sidewall and the first central flange, and the second spokes are held in tension between the second sidewall and the second central flange, and wherein each of the first spokes is aligned with a respective one of the second spokes to form a pair of aligned spokes on opposite sides of the longitudinal plane, the first end portions of each of the first and second spokes of the pair of aligned spokes are tied together near the annular sidewalls with a tie member that restricts the first end portions of the pair of aligned spokes from moving away from each other in a direction normal to the longitudinal plane, and
wherein each of the central flange portions of the first side element and the second side element are coupled to their respective end portions of the hub tube using a cap, wherein a portion of the cap extends into the hub tube and wherein a head of the cap captures a portion of each flange portion.

19. The wheel of claim 18 wherein the first sidewall of the first side element has a first radially inner edge portion and the second sidewall of the second side element has a second radially inner edge portion affixed to the first radially inner edge portion to prevent the first and second radially inner edge portions from separating in a direction normal to the longitudinal plane.

20. The wheel of claim 19, wherein the first and second radially inner edge portions are affixed to each other substantially at the longitudinal plane.

21. The wheel of claim 18 wherein each of the first and second side elements are made of a fiber based material.

22. The wheel of claim 18 wherein each of the plurality of first spokes are disposed on the first side of the longitudinal plane and do not cross to the second side of the longitudinal plane, and each of the plurality of second spokes are disposed on the second side of the longitudinal plane and do not cross to the first side of the longitudinal plane.

23. The wheel of claim 18 wherein at least a portion of the first spoke and a portion of the first sidewall are constructed of at least one continuous layer of cured, fiber-based material.

24. The wheel of claim 23 wherein the at least one continuous layer of cured, fiber-based material is a sheet of carbon-fiber fabric.

25. The wheel of claim 23 wherein at least a portion of the second spoke and a portion of the second sidewall are constructed of a least one continuous layer of cured, fiber-based material.

26. The wheel of claim 18 wherein at least a portion of one of the first spokes, a portion of the first central flange portion, and a portion of the first sidewall are constructed of a least one continuous layer of carbon-fiber material.

27. The wheel of claim 26 wherein at least a portion of one of the second spokes, a portion of the second central flange portion, and a portion of the second sidewall are constructed of at least one continuous layer of carbon-fiber material.

28. A method of making a bicycle wheel having a rim, a hub, and a pair of opposing unitary first and second side elements, wherein the wheel has an axis of rotation and a longitudinal plane normal to the axis of rotation, the method comprising:
attaching the first and second unitary side elements to the rim, wherein the first unitary side element has a first flange portion, a first annular sidewall with a first outer engagement portion and a first inner engagement portion, and first spokes being disposed on the first side of the longitudinal plane and integrally interconnecting the first annular sidewall and the first flange portion, and the second unitary side element has a second flange portion, a second annular sidewall with a second outer engagement portion and a second inner engagement portion, and second spokes being disposed on the second side of the longitudinal plane and integrally interconnecting the second annular sidewall and the second flange portion, wherein the first outer engagement portion is attached to a first side of the rim on a first side of the longitudinal axis, and the second outer engagement portion is attached to a second side of the rim on a second side of the longitudinal axis;

fixing the first inner engagement portion of the first sidewall to the second inner engagement portion of the second sidewall;

attaching the first flange portion to a first end portion of the hub on the first side of the longitudinal plane using a cap;

attaching the second flange portion to a second end portion of the hub on the second side of the longitudinal plane using a cap, wherein separation of the first and second flange portions away from the longitudinal plane holds the first spokes in tension between the first sidewall and the first flange portion and holds the second spokes in tension between the second sidewall and the second flange portion and wherein the cap captures a portion of each flange portion between a head of the cap and the hub; and tying with a tie member a radially outward end portion of each of the first spokes to an aligned radially outward end portion of an aligned one the second spokes to define pairs of aligned spokes to restrict the radially outward end portions of the pairs of aligned spokes from moving away from each other in a direction normal to the longitudinal plane.

29. A method of making a fiber-based wheel for a bicycle, comprising:

forming unitary fiber-based first and second side elements each having an annular sidewall, a central flange portion radially inward of the sidewall, and a plurality of spokes extending between the sidewall and the central flange, wherein each side element is formed by laying up a plurality of layers of fiber-based material shaped to form the sidewall, the central flange and the spokes with at least first continuous fibers extending between the flange and the spokes and at least second continuous fibers extending between the spokes and the central flange, and curing the entire side element with heat and pressure in one curing process to form a cured side element with the spokes integrally connected to the sidewall and the flange;

positioning the first and second side elements adjacent to a rim and with the spokes in alignment with each other;

affixing the sidewalls of the first and second side elements to opposing side surfaces of the rim;

positioning the central flanges of the first and second side elements on a hub and positioning the first and second side elements so the spokes are in tension; and fixing the flanges of the first and second side elements to the hub using a cap that captures a portion of each central flange portion between a head of the cap and the hub.

30. The method of claim 29, wherein laying up a plurality of layers of fiber-based material includes laying up at least one layer of fiber-based material that forms a portion of the sidewall, at least one spoke, and a portion of the central flange.

31. The method of claim 30 wherein laying up the at least one layer includes positioning the at least one layer of fiber-based material so a plurality of fibers extend continuously along the sidewall, the at least one spoke, and the central flange.

32. The method of claim 29, further comprising tying together end portions of aligned spokes of the first and second side elements adjacent to the sidewalls to restrict the end portions of the aligned spokes from moving laterally apart from each other.

* * * * *